(12) United States Patent
Huang et al.

(10) Patent No.: US 9,874,783 B2
(45) Date of Patent: Jan. 23, 2018

(54) LIQUID CRYSTAL DISPLAY SUBSTRATE AND PREPARATION METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Zhubing Huang, Beijing (CN); Hui Jing, Beijing (CN); Xiaofeng Wang, Beijing (CN); Defa Ruan, Beijing (CN); De Yu, Beijing (CN)

(73) Assignees: BOE TECHNOLOGY GROUP CO., LTD., Beijing (CN); HEFEI XINGSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/744,561

(22) Filed: Jun. 19, 2015

(65) Prior Publication Data
US 2016/0274401 A1    Sep. 22, 2016

(30) Foreign Application Priority Data
Mar. 17, 2015  (CN) .......................... 2015 1 0117047

(51) Int. Cl.
*G02F 1/1337* (2006.01)
*G02F 1/1362* (2006.01)

(52) U.S. Cl.
CPC ...... *G02F 1/133723* (2013.01); *G02F 1/1337* (2013.01); *G02F 1/136227* (2013.01); *G02F 2001/133776* (2013.01)

(58) Field of Classification Search
CPC ........... G02F 1/136227; G02F 1/13394; G02F 1/1368; G02F 1/133723
See application file for complete search history.

(56) References Cited

U.S. PATENT DOCUMENTS

2013/0169901 A1* 7/2013 Kim .................. H01L 29/78633
349/43

FOREIGN PATENT DOCUMENTS

| CN | 102650786 A | 8/2012 |
|---|---|---|
| CN | 102854669 A | 1/2013 |
| CN | 203630483 U | 6/2014 |

(Continued)

OTHER PUBLICATIONS

First Office Action dated Jan. 23, 2017 in corresponding Chinese Application No. 201510117047.0.

*Primary Examiner* — James Dudek
(74) *Attorney, Agent, or Firm* — Nath, Goldberg & Meyer; Joshua B. Goldberg; Annie J. Kock

(57) ABSTRACT

The present invention provides a liquid crystal display substrate and a preparation method thereof, which belongs to the technical field of liquid crystal display and may solve the problem that vias in the existing liquid crystal display substrate will result in non-uniform thickness of an alignment layer and thus influence the display effect. The liquid crystal display substrate provided by the present invention comprises a plurality of display structures, and an alignment layer located above all the display structures, wherein at least some of the display structures are provided therein with vias, and at least some of the vias are surrounded by baffle walls that are located under the alignment layer.

20 Claims, 3 Drawing Sheets

(56) References Cited

FOREIGN PATENT DOCUMENTS

CN 104238213 A 12/2014
JP 2000-122071 A 4/2000

\* cited by examiner

– 1 –

LIQUID CRYSTAL DISPLAY SUBSTRATE AND PREPARATION METHOD THEREOF

FIELD OF THE INVENTION

The present invention belongs to the technical field of liquid crystal display and particularly relates to a liquid crystal display substrate and a preparation method thereof.

BACKGROUND OF THE INVENTION

In an array substrate of a liquid crystal display device, vias are arranged at many positions. For example, as shown in FIG. 1 and FIG. 2, a via 8 is arranged in a passivation layer 4 above a drain 14 of a thin film transistor, and a pixel electrode 3 is connected to the drain 14 through the via 8. In an array substrate, an alignment layer 5 covering other display structure is further provided for allowing liquid crystal molecules to realize a desired orientation. Due to the presence of the via 8, the alignment layer 5 will be depressed at the position of the via 8, but the via 8 is not used for displaying, so that the depression of the alignment 5 has no influence on the display effect. The array substrate further includes an active region 11, a gate 12, a source 13, a gate insulating layer 2, a base substrate 9 and other known structures, and these known structures will not be described one by one.

The inventor has found out at least the following problems in the prior art: the alignment 5 is formed by curing alignment liquid (e.g., polyimide solution), but the alignment liquid has fluidity, so the alignment liquid around the via 8 will spread into the via 8 before curing or during curing; meanwhile, as the curing continues, the fluidity of the alignment liquid gradually becomes poor (that is, the alignment liquid gradually becomes "sticky"), so the alignment liquid cannot be supplied to the surrounding of the via. As a result, the thickness of the finally formed alignment layer 5 around the via 8 is not uniform, but the positions (e.g., pixel electrode 3) around the via 8 may be used for displaying, so that the non-uniform thickness of the alignment layer 5 will influence displaying and thus reduces the yield and quality of products.

SUMMARY OF THE INVENTION

In view of the problem that vias in an existing liquid crystal display substrate will result in non-uniform thickness of an alignment layer and thus influence the display effect, the present invention provides a liquid crystal display substrate and a preparation method thereof, which may avoid this problem.

To solve the above technical problem, the following technical solution is employed: a liquid crystal display substrate is provided, including a plurality of display structures and an alignment layer located above all the display structures, wherein at least some of the display structures are provided therein with vias, and at least some of the vias are surrounded by baffle walls.

In an embodiment, the alignment layer is formed by curing alignment liquid, and a height of the baffle wall is greater than or equal to a thickness of the alignment liquid for forming the alignment layer.

In an embodiment, the alignment layer is formed by curing alignment liquid, and a height of the baffle wall is less than or equal to a thickness of the alignment liquid for forming the alignment layer but greater than or equal to a thickness of the alignment layer.

In an embodiment, a width of the baffle wall ranges from 1000 nm to 100000 nm.

In an embodiment, a height of the baffle wall ranges from 50 nm to 3000 nm.

In an embodiment, the baffle wall is located above a topmost one of the display structures around the vias.

In an embodiment, the baffle wall is at least located under one of the display structures around the vias.

In an embodiment, the baffle wall is composed of multiple layers of sub baffle walls.

In an embodiment, the baffle wall and at least one display structure are arranged in a same layer.

In an embodiment, the baffle wall is formed of conductive material.

In an embodiment, the liquid crystal display substrate is an array substrate, wherein, each of the display structures includes a drain of a thin film transistor, a passivation layer covering the drain, and a pixel electrode located on the passivation layer; and, the vias include a via in the passivation layer, and the pixel electrode is connected to the drain of the thin film transistor through the via.

To solve the above technical problem, the following technical solution is employed: a preparation method of the above liquid crystal display substrate is provided, including the following steps:

forming a pattern including the baffle wall on a base substrate; and after preparing all the display structures, coating alignment liquid on the base substrate after the previous step, and curing the alignment liquid to form an alignment layer.

In an embodiment, the forming the pattern including the baffle wall on the base substrate includes: simultaneously forming a pattern including at least one display structure and the baffle wall on the base substrate.

In an embodiment, the forming the pattern including the baffle wall on the base substrate includes: separately forming a pattern of the baffle wall on the base substrate.

Herein, "arranged in the same layer" refers to the fact that two structures are formed of a same material layer and they may be manufactured in the same patterning process, but does not mean that the distances of the two relative to a base substrate must be equal.

In the array substrate provided by the present invention, as the vias are surrounded by a baffle wall, the alignment liquid will be blocked by the baffle wall and thus cannot be diffused in the vias after coating the alignment liquid, so that the thickness of the alignment layer around the vias is uniform, and the display effect is improved. Moreover, as the vias are not used for displaying, the displaying will not be influenced although the thickness of the alignment layer at the vias is different from that of the alignment layer around the vias.

REFERENCE NUMERALS

Figure 1:
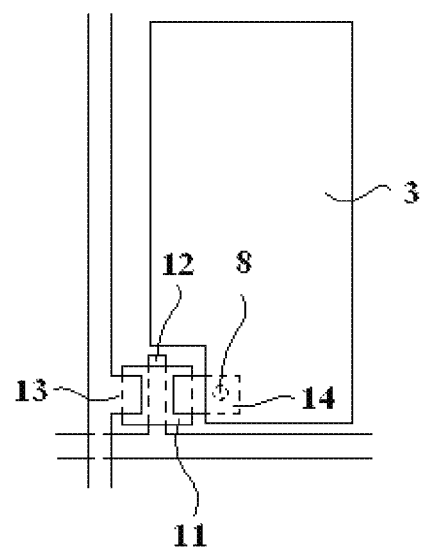
FIG. 1 is a schematic top view of a part of an existing array substrate.
Figure 2:
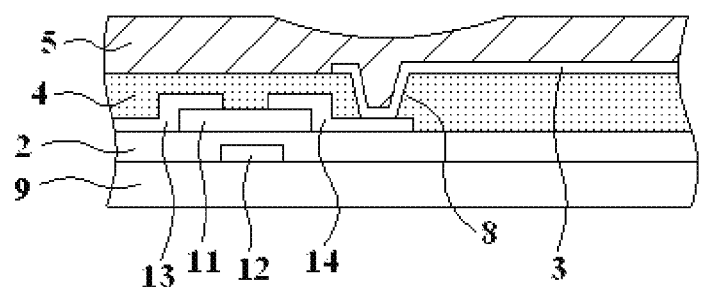
FIG. 2 is a schematic sectional view of a part of an existing array substrate.
Figure 3:
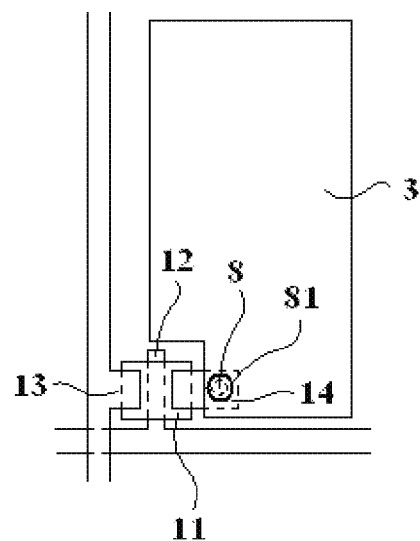
FIG. 3 is a schematic top view of a part of an array substrate according to an embodiment of the present invention.

11: active region;
12: gate;
13: source;
14: drain;
2: gate insulating layer;
3: pixel electrode;
4: passivation layer;
5: alignment layer;
8: via;
81: baffle wall;
811: sub baffle walls; and
9: base substrate.

DETAILED DESCRIPTION OF THE EMBODIMENTS

To make those skilled in the art better understand the technical solutions of the present invention, the present invention will be further described as below in details with reference to the drawings and specific embodiments.

Embodiment 1

This embodiment provides a liquid crystal display substrate, including a plurality of display structures and an alignment layer located above all the display structures, wherein at least some of the display structures are provided therein with vias, and at least some of the vias are surrounded by baffle walls that are located under the alignment layer.

In the array substrate provided by this embodiment, as the via is surrounded by a baffle wall, the alignment liquid will be blocked by the baffle wall and thus cannot be diffused in the vias after coating the alignment liquid, so that the thickness of the alignment layer around the vias is uniform, and the display effect is improved. Moreover, as the vias are not used for displaying, the displaying will not be influenced although the thickness of the alignment layer at the vias is different from that of the alignment layer around the vias.

Embodiment 2

As shown in FIGS. 3-6, this embodiment provides a liquid crystal display substrate, including a plurality of display structures and an alignment layer 5 located above all the display structures, wherein at least some of the display structures are provided therein with vias 8.

The liquid crystal display substrate refers to a substrate for assembling a liquid crystal display device, including an array substrate or a color film substrate. The display structures refer to structures arranged on a base substrate 9 of a liquid display substrate and used for realizing a display function, including gate lines, data lines, common electrode lines, an active layer 11, a gate, 12, a gate insulating layer 2, a source 13, a drain 14, a pixel electrode 3, a common electrode, a passivation layer 4, a planarization layer, a color filer film, a black matrix and so on. These display structures may be complete layers (e.g., a planarization layer) or patterns merely located at partial positions (e.g., a pixel electrode 3, a drain 14, etc.). As the display structures are successively formed layer by layer, they are classified into multiple layers. Multiple kinds of display structures may be included in the same layer (for example, the source 13 and the drain 14 are arranged in the same layer). The distances between respective display structures in the same layer and the base substrate 9 may be not equal.

In some of the display structures, provided are vias 8, i.e., holes running through the display structures, for connecting a structure located above a display structure to another structure located under the display structure. Multiple layers of adjacent display structures may also be provided with a communicated via 8. That is, a via 8 may run through multiple layers of display structures.

Specifically, in this embodiment, the description will be illustrated by taking a via 8 for connecting the drain 14 with the pixel electrode 3 as an example. In other words, the liquid crystal display substrate is an array substrate, and the display structures include a drain 14 of a thin film transistor, a passivation layer 4 covering the drain 14 and a pixel electrode 3 located above the passivation layer 4. The via 8 is located in the passivation layer 4, and the pixel electrode 3 is connected to the drain 14 of the thin film transistor through the via 8.

The application range of the present invention is not limited thereto, and other vias 8 including a via 8 for connecting the active region 11 with the source 13/drain 14 or a via 8 for connecting a common electrode with a common electrode line, and the like, may also be used. Although the vias 8 are located at different positions and in different display structures, the principle of applying the present invention to these vias is identical and will not be described one by one.

Meanwhile, the liquid display substrate further includes an alignment layer 5 that covers all the display structures. In other words, the liquid display substrate further includes an alignment layer 5 covering all the above display structures. As the alignment layer 5 is located on the top of the liquid crystal display substrate, the alignment layers 5 may come into contact with the liquid crystal when the liquid crystal display substrate is used to assemble a liquid crystal device, so that the liquid crystal is allowed to realize a desired orientation.

In the liquid crystal display substrate provided by this embodiment, at least some of the vias 8 are surrounded by baffle walls 81, and the baffle walls 81 are located under the alignment layer 5.

That is, where there is a vias 8, a protruded baffle wall 81 surrounding the vias is further provided. That is, the via 8 is enclosed by the protruded baffle wall 81. As described above, the alignment layer 5 is cured from an alignment liquid, and after coating the alignment liquid on the substrate in this embodiment, the baffle wall 81 will separate the inside from the outside of the vias 8, so that, although the alignment liquid at the vias 8 has a lower height, the alignment liquid around the vias 8 is unable to flow into the vias 8. In this way, in the finally formed alignment layer 5, the alignment layer 5 around the vias 8 has a uniform thickness, thereby not influencing displaying. Although the thickness of the alignment layer 5 at the positions of the vias 8 and the baffle wall 81 is different from that of the alignment layer 5 around the vias 8, the displaying effect will not be influenced as those positions are not used for displaying.

In an embodiment, the alignment layer 5 is cured from an alignment liquid, and the height of the baffle wall 81 is greater than or equal to the thickness of the alignment liquid forming the alignment layer 5.

If it is required to block the flowing of the alignment liquid completely, the top of the baffle wall 81 should be protruded from the alignment liquid, that is, the height of the baffle wall 81 should be greater than the thickness of the alignment liquid.

In an embodiment, the alignment layer 8 is cured from an alignment liquid, and the height of the baffle wall 81 is less than or equal to the thickness of the alignment liquid forming the alignment layer 8 but greater than or equal to the thickness of the alignment layer 8. In an embodiment, the height of the baffle wall 81 ranges from 50 nm to 3000 nm.

As mentioned above, theoretically, if the height of the baffle wall 81 is greater than the initial thickness of the alignment liquid, the best blockage effect may be realized. However, in practice, the initial thickness of the alignment liquid is generally large. During the curing process, the alignment liquid will be diffused gradually and the thickness thereof is reduced. Therefore, the thickness of the finally formed alignment layer 8 is much smaller. In view of this, it will be advantageous as long as the baffle wall 81 can have a certain blocking function during the curing process, and it is unnecessary to require the height of the baffle wall 81 to be greater than the initial height of the alignment liquid. That is, as long as the height of the baffle wall 81 is greater than the thickness of the finally cured alignment layer 8 and less than the initial thickness of the alignment liquid, a certain blocking function may be realized. Meanwhile, such a baffle wall 81 is easy for implementation and has a small influence to other structures as it is not too high. Specifically, the initial thickness of the alignment liquid is usually not more than 3000 nm, and the thickness of the finally formed alignment layer 8 is not less than 50 nm. Therefore, the height of the baffle wall 81 ranges from 50 nm to 3000 nm.

In an embodiment, the width of the baffle wall 81 ranges from 1000 nm to 100000 nm.

That is, the thickness of the "wall" of this baffle wall 81 should be within the above range. The baffle wall 81 cannot be too wide because the baffle wall 81 will cause non-uniform thickness of the alignment layer 5 at the position of the baffle wall 81. Hence, it is better if the baffle wall 81 occupies a smaller space. However, from the view point of a process, a too narrow baffle wall 81 is difficult in preparation and insufficient in strength.

In an embodiment, there may be the following positional relationships between the baffle wall 81 and the display structures around the vias 8:

(1) the baffle wall 81 is located on an uppermost display structure surrounding the vias 8.

Figure 4:
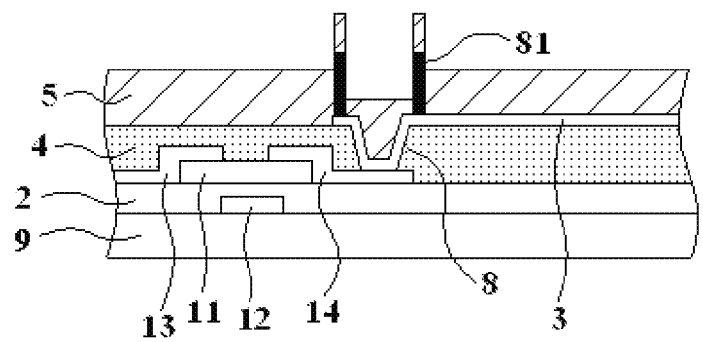
FIG. 4 is a schematic sectional view of a part of an array substrate according to an embodiment of the present invention.

That is, the baffle wall 81 is located over all the display structures around the vias 8, so as to come into direct contact with the alignment layer 5. For example, as shown in FIG. 4, for a via 8 on the drain 14, the uppermost display structure around the via 8 is the pixel electrode 3. Therefore, the baffle wall 81 may be directly located on the pixel electrode 3.

According to the above design, the baffle wall 81 is located in the uppermost, so that the presence of the baffle wall 81 will not influence other display structures. For example, the breakage of the display structures above will not be caused due to the too large height of the baffle wall 81.

(2) the baffle wall 81 is at least partially covered by the display structures around the vias 8.

Figure 5:
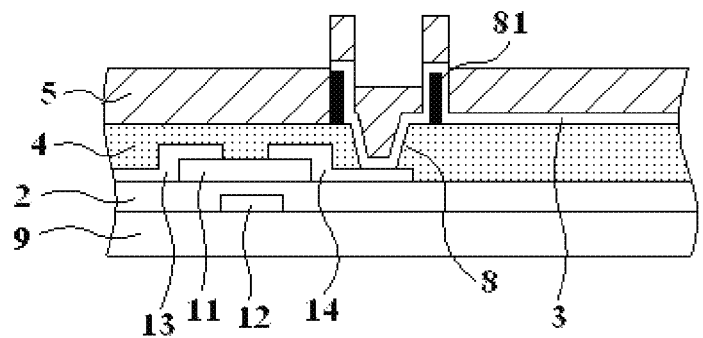
FIG. 5 is a schematic sectional view of a part of another array substrate according to an embodiment of the present invention.

At least a part of the baffle wall 81 may be covered by the display structures, for example, directly located on the base substrate 9, or located between two adjacent layers of display structures. For example, as shown in FIG. 5, for the via 8 on the drain 14, the baffle wall 81 may be located on the passivation layer 4 and below the pixel electrode 3. It should be understood that, although the baffle wall 81 is not located in the uppermost in this case, it may still lead to deformation of the display structures above the baffle wall 81, thus finally forming bumps around the vias 8.

Such a baffle wall 81 is flexibly positioned depending upon actual demands, and thus easy for implementation.

(3) the baffle wall 81 consists of a plurality of layers of sub-baffle walls 811.

Figure 6:
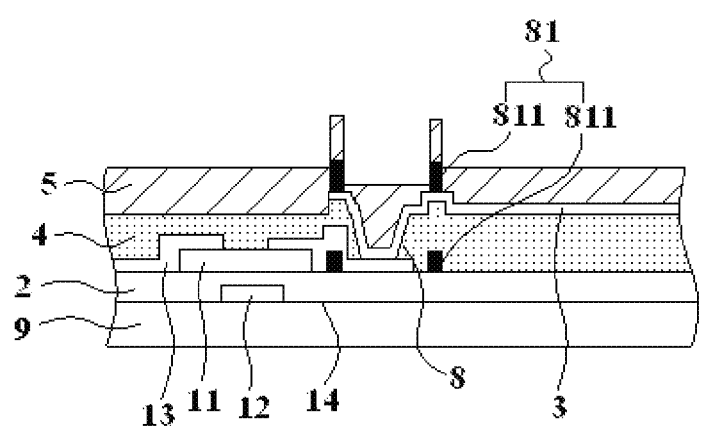
FIG. 6 is a schematic sectional view of a part of another array substrate according to an embodiment of the present invention.

That is, the baffle wall 81 itself may consist of a plurality of layers of different sub-baffle walls 811. For example, as shown in FIG. 6, for the via 8 on the drain 14, one sub-baffle wall 811 may be located on the gate insulating layer, and another sub-baffle wall 811 is located on the pixel electrode 3, and both form the baffle wall 81 together. There may be no any other display structures between the layers of sub-baffle walls 811, that is, the sub-baffle walls 811 may come into direct contact with each other.

As described above, the baffle wall 81 needs to have a large height. If it consists of only one layer of structure, this structure will be too large in height and difficult for implementation in terms of processes. To this end, the baffle wall 81 may be formed of a plurality of layers of structures in order to reduce the thickness of each layer of the sub-baffle wall 811.

In an embodiment, the baffle wall 81 is arranged in the same layer as at least one display structure.

As there is no baffle wall 81 in the existing liquid crystal display substrate, a separate step may be added to prepare this baffle wall 81. However, to simplify the preparation process, the baffle wall 81 or a part (sub-baffle wall 811) of the baffle wall 81 may be formed simultaneously when other display structures are prepared. That is, when display structures that would not be located around the vias 8 are prepared, a structure surrounding the vias 8 is also formed as the baffle wall 81 or as a part of the baffle wall 81. For example, for the baffle wall 81 as shown in FIG. 6, the lower sub-baffle wall 811 may be in the same layer as the active region 11 (i.e., formed simultaneously).

In an embodiment, the baffle wall 81 is made of conductive material.

In general, as vias 8 are generally used for implementing electric connections between different display structures, the vias 8 are usually filled with conductive material. Therefore, the baffle wall 81 may be made of conductive material (for example, indium tin oxide, ITO). In this way, even if the baffle wall 81 causes the breakage of the conductive structure in the vias 8, the baffle wall 81 itself may play a role of conducting.

The embodiment further provides a preparation method of the above liquid crystal display substrate, including the following steps:

forming a pattern including the baffle wall 81 on a base substrate 9; and after preparing all the display structures, coating alignment liquid on the base substrate 9 after the previous step, and curing the alignment liquid to form an alignment layer 5.

That is, during the preparation of the above liquid crystal display substrate, the baffle wall 81 is formed first; and after all the display structures are prepared, the alignment liquid is coated and the alignment layer 5 is formed, thereby avoiding the non-uniform thickness of the alignment layer 5 around the vias 8.

The specific form, position, preparation method and the like of each of the display structures are varied and well-known, and will not be repeated herein.

Meanwhile, the positional relationships between the baffle wall 81 and the display structures are also varied. As described above, the baffle wall 81 may be located on all the display structures so that the baffle wall 81 may be prepared after other display structures are prepared; or, the baffle wall 81 may be located between some display structures so that the baffle wall 81 may be prepared after some display structures are prepared and then other display structures are prepared continuously. Hence, the order for preparing the baffle wall 81 and the display structures is varied, and will not be repeated herein.

In general, the above display structures and the baffle wall 81 may be all formed by the patterning process. The patterning process is a process for forming a structure with specific pattern, including photolithography, screen printing and the like. Photolithography is one of the most important patterning processes, including one or more steps of formation of a material layer (for example, by coating, evaporation, sputtering, chemical vapor deposition and the like), coating of photoresist, exposure, development, etching, peeling the photoresist off and the like.

In an embodiment, forming the pattern including the baffle wall 81 on the base substrate 9 includes the following steps:

simultaneously forming a pattern including at least one display structure and the baffle wall 81 on the base substrate 9; or separately forming a pattern of the baffle wall 81 on the base substrate 9.

That is, as described above, the baffle wall 81 may be formed in the same step in which other display structures are prepared. That is, some display structures and the baffle wall 81 (or part of the baffle wall 81) are formed simultaneously by one patterning process. Or, as described above, the baffle wall 81 may be manufactured in a new step.

It may be understood that, the above embodiments are exemplary embodiments which are merely used to describe the principle of the present invention, and the present invention is not limited thereto. For a person of ordinary skill in the art, various variations and improvements may be made without departing from the spirit and essence of the present invention, and those variations and improvements should also be regarded as falling into the protection scope of the present invention.

The invention claimed is:

1. A liquid crystal display substrate, comprising a substrate having a plurality of display structures thereon and an alignment layer is located above all the display structures, wherein at least some of the display structures are provided therein with vias, wherein,
   at least some of the vias are surrounded by baffle walls, and an orthogonal projection of the baffle wall on the substrate does not overlap an orthogonal projection of the via on the substrate.

2. The liquid crystal display substrate according to claim 1, wherein,
   the alignment layer is formed by curing alignment liquid, and a height of the baffle wall is greater than or equal to a thickness of the alignment liquid for forming the alignment layer.

3. The liquid crystal display substrate according to claim 1, wherein,
   the alignment layer is formed by curing alignment liquid, and a height of the baffle wall is less than or equal to a thickness of the alignment liquid for forming the alignment layer but greater than or equal to a thickness of the alignment layer.

4. The liquid crystal display substrate according to claim 1, wherein,
   a width of the baffle wall ranges from 1000 nm to 100000 nm.

5. The liquid crystal display substrate according to claim 1, wherein a height of the baffle wall ranges from 50 nm to 3000 nm.

6. The liquid crystal display substrate according to claim 1, wherein,
   the baffle wall is located above a topmost one of the display structures around the vias.

7. The liquid crystal display substrate according to claim 1, wherein,
   the baffle wall is at least partially covered by the display structures around the vias.

8. The liquid crystal display substrate according to claim 2, wherein,
   the baffle wall is at least partially covered by the display structures around the vias.

9. The liquid crystal display substrate according to claim 3, wherein,
   the baffle wall is at least partially covered by the display structures around the vias.

10. The liquid crystal display substrate according to claim 1, wherein,
    the baffle wall is composed of multiple layers of sub baffle walls.

11. The liquid crystal display substrate according to claim 2, wherein,
    the baffle wall is composed of multiple layers of sub baffle walls.

12. The liquid crystal display substrate according to claim 3, wherein,
    the baffle wall is composed of multiple layers of sub baffle walls.

13. The liquid crystal display substrate according to claim 1, wherein,
    the baffle wall and at least one display structure are arranged in a same layer.

14. The liquid crystal display substrate according to claim 1, wherein,
    the baffle wall is formed of conductive material.

15. The liquid crystal display substrate according to claim 2, wherein,
    the baffle wall is formed of conductive material.

16. The liquid crystal display substrate according to claim 3, wherein,
    the baffle wall is formed of conductive material.

17. The liquid crystal display substrate according to claim 1, wherein the liquid crystal display substrate is an array substrate;
    each of the display structures comprises a drain of a thin film transistor, a passivation layer covering the drain, and a pixel electrode located on the passivation layer; and
    the vias comprise a via in the passivation layer, and the pixel electrode is connected to the drain of the thin film transistor through the via.

18. A preparation method of the liquid crystal display substrate according to claim 1, wherein the preparation method of the liquid crystal display substrate comprises the following steps:
    forming a pattern comprising the baffle wall on a base substrate; and after preparing all the display structures, coating alignment liquid on the base substrate after the previous step, and curing the alignment liquid to form an alignment layer.

19. The preparation method of a liquid crystal display substrate according to claim 18, wherein the forming the pattern comprising the baffle wall on the base substrate comprises:

simultaneously forming a pattern comprising at least one display structure and the baffle wall on the base substrate.

20. The preparation method of a liquid crystal display substrate according to claim 18, wherein the forming the pattern comprising the baffle wall on the base substrate comprises:

separately forming a pattern of the baffle wall on the base substrate.

\* \* \* \* \*